No. 845,305. PATENTED FEB. 26, 1907.
H. LIEBERT.
CONTROL AND COPYING DEVICE FOR MACHINE TOOLS.
APPLICATION FILED JULY 18, 1904.

3 SHEETS—SHEET 1.

Witnesses.
James C. Babcock
Louis H. Schmidt

Inventor
Henry Liebert
by W. H. Babcock
Attorney

No. 845,305. PATENTED FEB. 26, 1907.
H. LIEBERT.
CONTROL AND COPYING DEVICE FOR MACHINE TOOLS.
APPLICATION FILED JULY 18, 1904.

3 SHEETS—SHEET 3.

UNITED STATES PATENT OFFICE.

HENRY LIEBERT, OF MILNROW, ENGLAND.

CONTROL AND COPYING DEVICE FOR MACHINE-TOOLS.

No. 845,305.

Specification of Letters Patent.

Patented Feb. 26, 1907.

Application filed July 18, 1904. Serial No. 217,121.

*To all whom it may concern:*

Be it known that I, HENRY LIEBERT, a subject of the King of Great Britain and Ireland, and a resident of Perseverance Works, Milnrow, Lancashire, England, have invented a certain new and useful Control and Copying Device for Machine-Tools, (for which I have filed application for British Patent No. 7,085, of March 24, A. D. 1904;) and I do hereby declare the following to be a full, clear, and exact description of the invention, such as will enable others skilled in the art to which it appertains to make and use the same.

This invention is an improvement on the machine forming the subject-matter of British Patent No. 13,384 of 1899, in which a screw-like former, otherwise known as a "control-scroll," was turned in contact with a finger governing the movement of a cutting or abrading tool or the article to be operated on for reproducing in the latter any desired outline.

The chief object of the said invention is to provide for the positive movement of the tool (or alternatively of the article operated on) in both directions instead of depending on a counterbalance-weight or its equivalent for the return movement thereof and to adapt the same to certain special uses. To these ends I employ two or more control-scrolls instead of one; and the present invention consists, chiefly, in the combination of them with divers coöperating parts, as hereinafter more particularly set forth and claimed.

Figure 1:
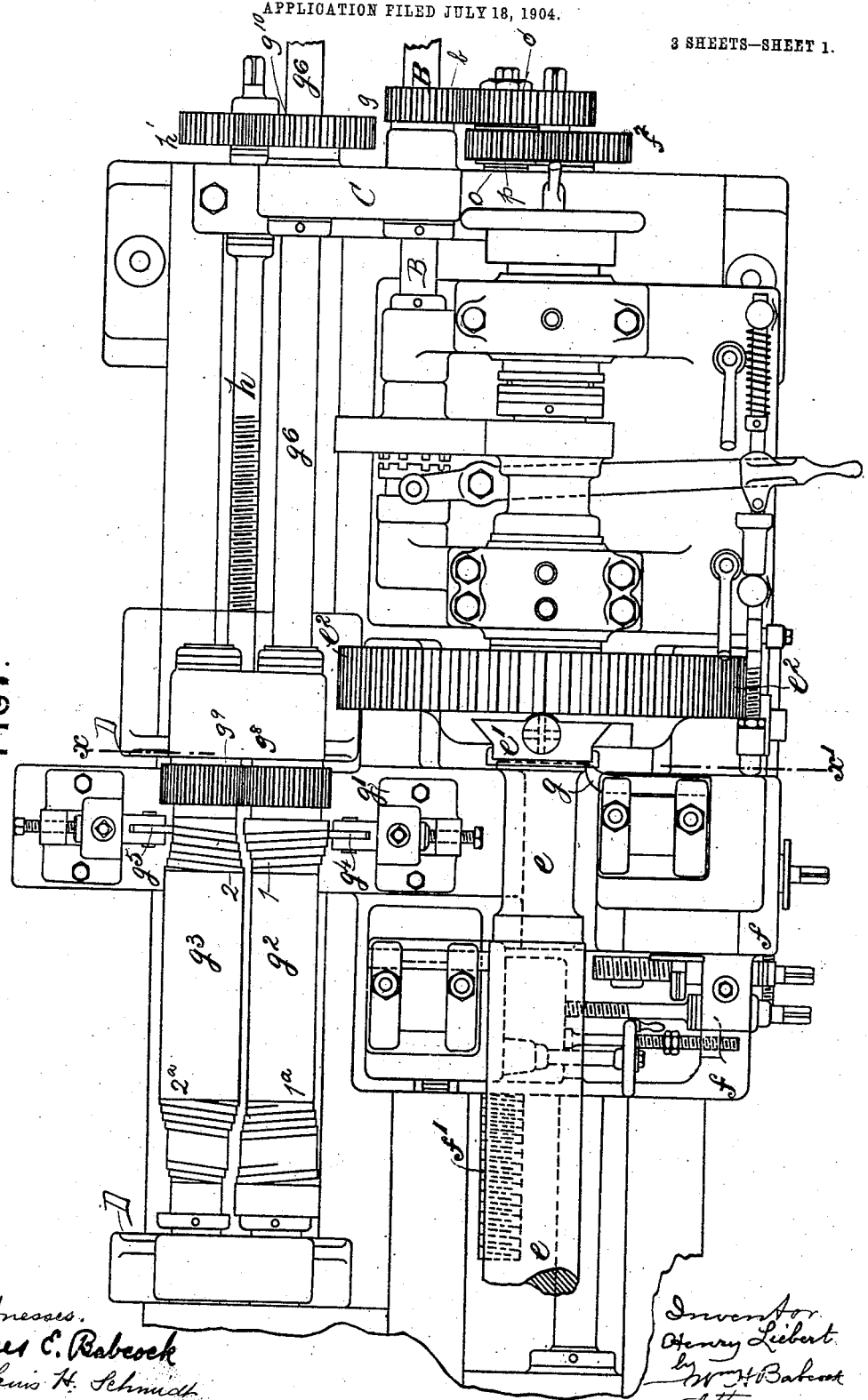
Figure 2:
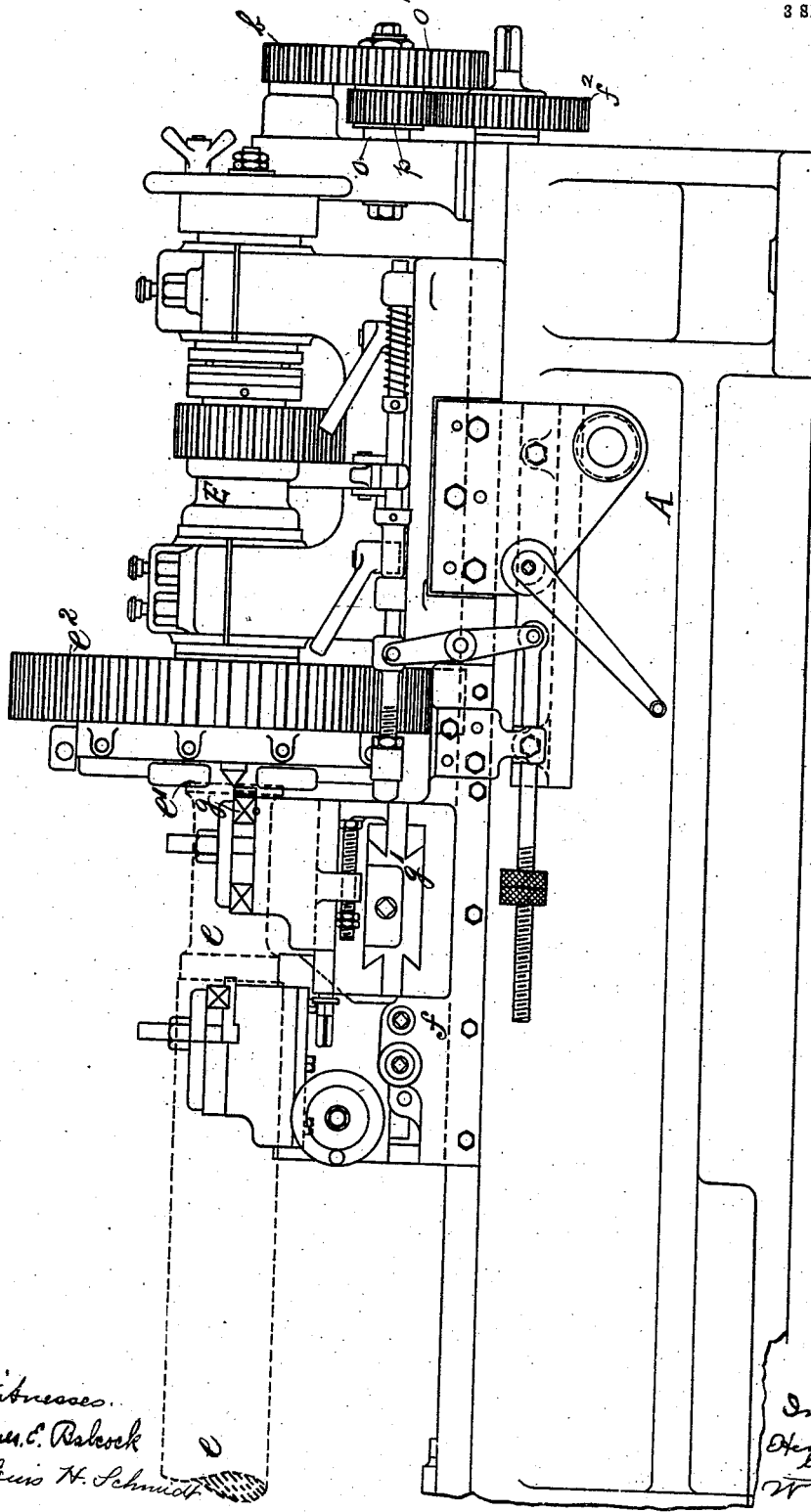
Figure 3:
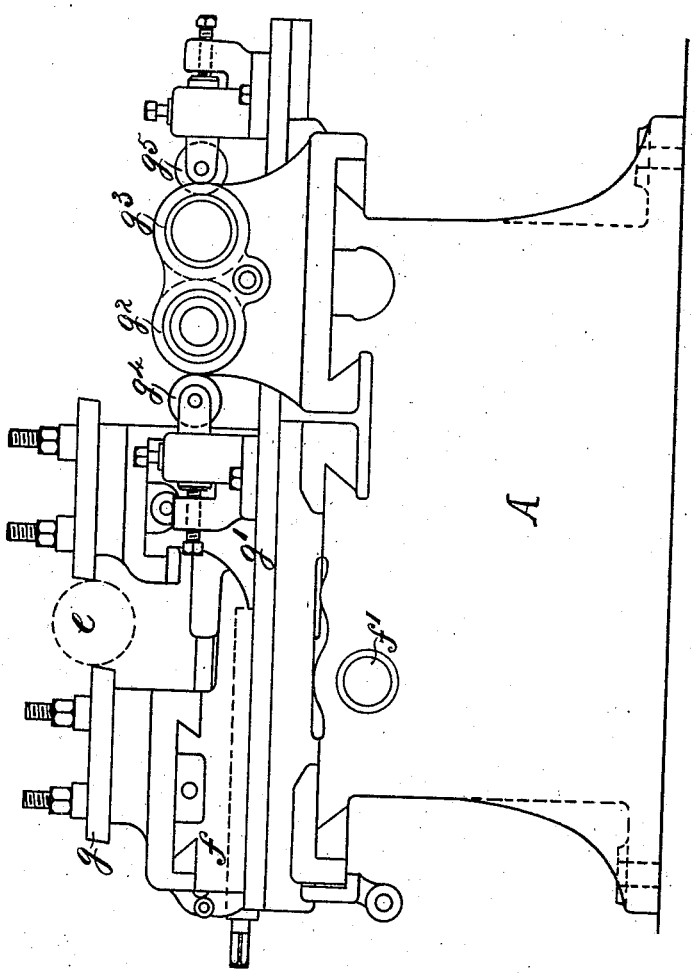

In the accompanying drawings, Figure 1 represents a plan view of a machine embodying my invention adapted to turn the heads of the axles of rolling-stock. Fig. 2 represents a front elevation of the same. Fig. 3 represents an end elevation of the same looking to the left, the parts on the machine-bed to the right of line $x\ x'$ being removed.

A designates the main frame of the machine, B the main shaft supported thereby, and C a belt coupling the same to the shaft $g^6$ of one of the control-scrolls $g^2$ for driving the latter shaft from said main shaft. Pinions $g^8$ and $g^9$, fast, respectively, on this scroll and the other control-scroll $g^3$, couple these two parallel scrolls together and cause them to turn in opposite directions close to each other at the same rate of speed. These control-scrolls are equal in diameter at all corresponding points and provided at the ends with spirals reversely arranged with respect to each other. Rollers $g^4$ and $g^5$ are in contact with the tool-guiding spirals 1 and 2 of scrolls $g^2$ and $g^3$, respectively, on opposite sides of the pair of scrolls aforesaid. These rollers are mounted on a floating cross-slide $g'$, carrying tool $g$, and give to said cross-slide and tool a reciprocating transverse movement determined by the said spirals and shifting farther to the right or to the left as the said rollers travel lengthwise of the scroll with the floating cross-slide $g'$ and the longitudinally-moving main slide, on which the said cross-slide is mounted. This shifting of the position of the tool of course varies the cutting action correspondingly and gives the predetermined contour to the end of the car-axle $e$, which is held by a chuck $e'$ on the rotating lathe-mandrel E. At the other end of the pair of control-scrolls $g^2\ g^3$ two more tool-guiding spirals $1^a\ 2^a$ are formed, their relative arrangement being as before stated, but the taper of each spiral being the reverse of that on the other end of the same scroll. The spirals $1^a\ 2^a$ may be used for governing the cutting of the other end of the axle $e$. They differ slightly in form, and consequently in action, from spirals 1 and 2; but of course the possible modifications of such forms are very numerous, permitting any desired outline to be given by substituting one pattern of scroll for another. The said scrolls are mounted in a supplemental slide-frame D, engaged by a screw-shaft $h$, known as the "back" screw-shaft, which has a gear-wheel $h'$ fast on it, the latter meshing with a similar wheel $g^{10}$, fast on shaft $g^6$ and driven by the latter to cause the endwise travel of said slide-frame and of said scrolls.

The advantage of giving longitudinal movement to the scrolls, as well as to the tool and its rollers, is as follows: Unless the path be made broad enough the scroll crushes. The more path we get the more accurate is our work; but we cannot get a broader path by increasing the diameter, because in most cases it is advisable to have two scrolls—one for drawing the work in, the other for pushing the work out—and they would take up too much room if made of large diameter; besides other objections. The only other way to practically increase the width of the path is to make the scrolls travel at a much quicker rate than the tool-carriage. It has none of the disadvantages of increasing scroll diameter and insures accuracy of work.

A pinion $b$, fast on main shaft B, meshes with and drives a gear-wheel $o'$, turning on a stud $o$, with a pinion $p$, which engages a gear-wheel fast on the main screw-shaft $f'$, which is thereby turned in the direction opposite to that of the back screw-shaft $h$; but as screw-threads of these two shafts are inclined reversely (see Fig. 1) with respect to each other the sliding scroll-frame D and the main slide-frame $f$ travel in the same direction.

The mandrel E is provided with a large fast driving gear-wheel $e^2$, which meshes with and receives motion from a pinion on screw-shaft $f''$ or other rotative shaft of the machine, as may be found most convenient, thereby rotating the said mandrel and chuck.

Having thus described my invention, what I claim as new, and desire to secure by Letters Patent, is—

In mechanism for automatically shaping material to a predetermined form, the combination of a longitudinally-movable main slide, which carries the article to be acted on, with a floating slide transversely movable on the main slide, a tool carried by said floating slide for cutting or abrading the said article, a pair of rollers mounted on said floating slide and a pair of parallel control-scrolls, respectively in contact with said rollers and thereby moving the said floating slide and tool positively forward and backward transversely of the main slide according to the relative construction and arrangement of the said scrolls, to correspondingly vary the action of the tool and the form of the article, a back slide having the said scrolls mounted thereon and means for automatically and longitudinally reciprocating the said back frame and the scrolls thereon substantially as set forth.

In witness whereof I have hereunto set my hand in the presence of two witnesses.

HENRY LIEBERT.

Witnesses:
JOHN HALL,
G. W. TUNSTALL.